April 12, 1932.  J. FRIEDEL  1,853,410
TOWING AND HAULING CAR
Filed May 5, 1930  4 Sheets-Sheet 1

April 12, 1932.     J. FRIEDEL     1,853,410
TOWING AND HAULING CAR
Filed May 5, 1930     4 Sheets-Sheet 2

J. Friedel
Inventor
By C. A. Snow & Co.
Attorneys.

April 12, 1932.  J. FRIEDEL  1,853,410
TOWING AND HAULING CAR
Filed May 5, 1930   4 Sheets-Sheet 3
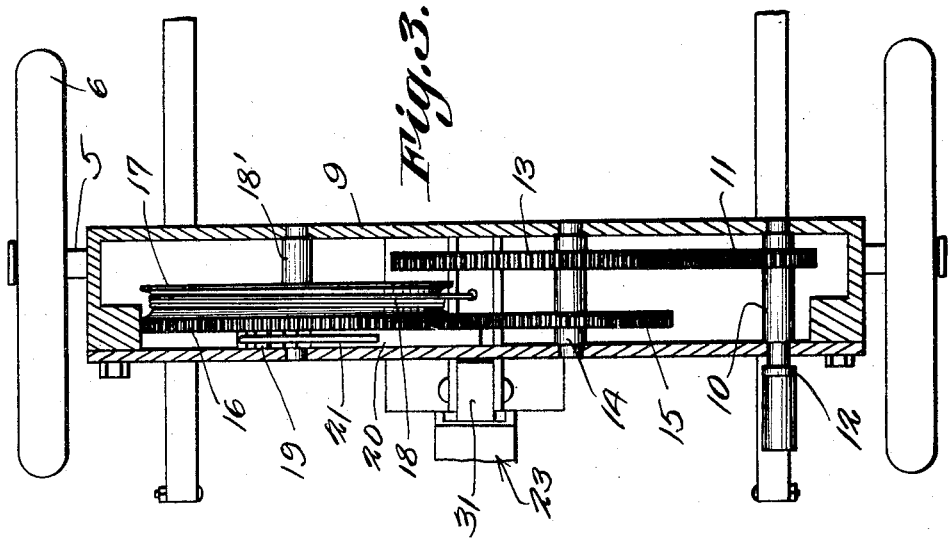
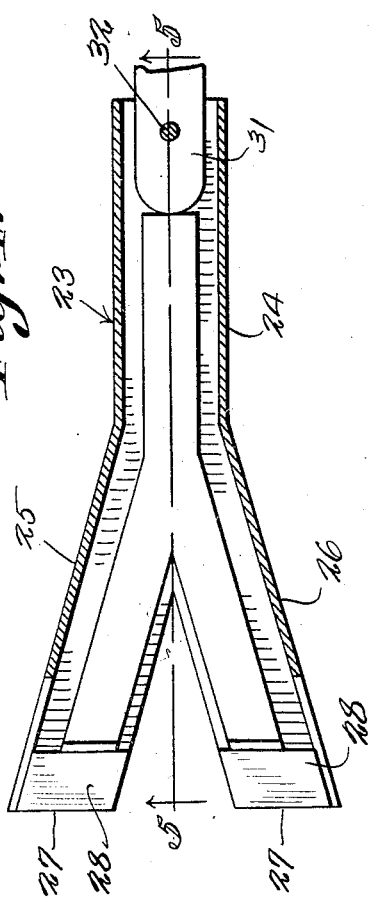
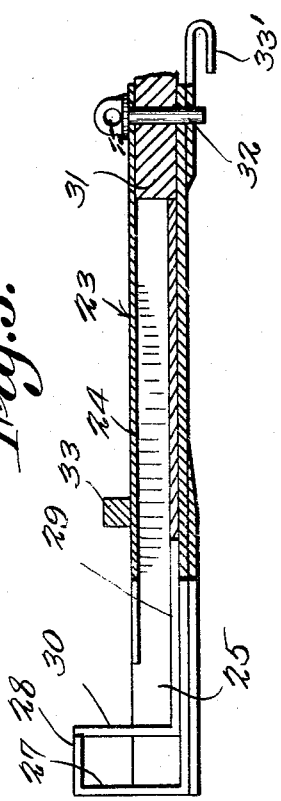
J. Friedel Inventor
By C.A.Snow&Co.
Attorneys.

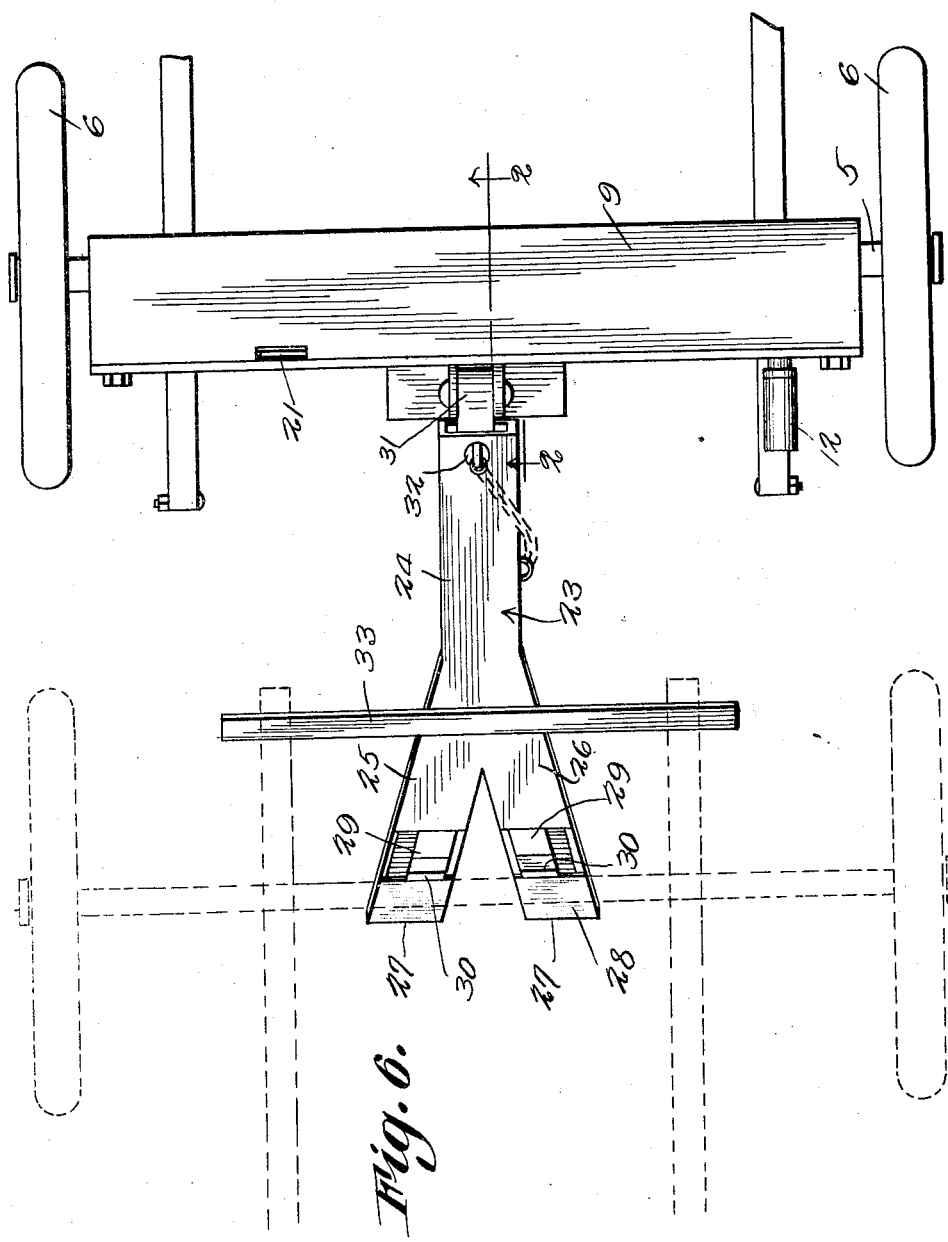

Patented Apr. 12, 1932

1,853,410

UNITED STATES PATENT OFFICE

JONAS FRIEDEL, OF OMAHA, NEBRASKA

TOWING AND HAULING CAR

Application filed May 5, 1930. Serial No. 450,036.

This invention relates to a truck designed primarily for use in lifting and towing automobiles, the primary object of the invention being to provide a truck of this character supplied with gearing for winding a lifting cable, the gearing being so constructed that an exceptionally heavy load may be lifted with a minimum amount of exertion on the part of the operator.

Another object of the invention is to provide gearing having means whereby the cable and weight supported thereby, will be held in an elevated position while the towing bar, forming a part of the invention, is positioned on the wrecked automobile.

A still further object of the invention is to provide a towing bar which may be readily and easily secured to the front axle of the wrecked automobile, the towing bar being such that the wrecked automobile will be guided, as it is being towed.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a transverse sectional view through the gear housing.

Figure 4 is a longitudinal sectional view through the towing bar.

Figure 5 is a sectional view taken on line 5—5 of Figure 4.

Figure 6 is a plan view illustrating the manner of connecting a wrecked automobile to the towing truck.

Figure 1:
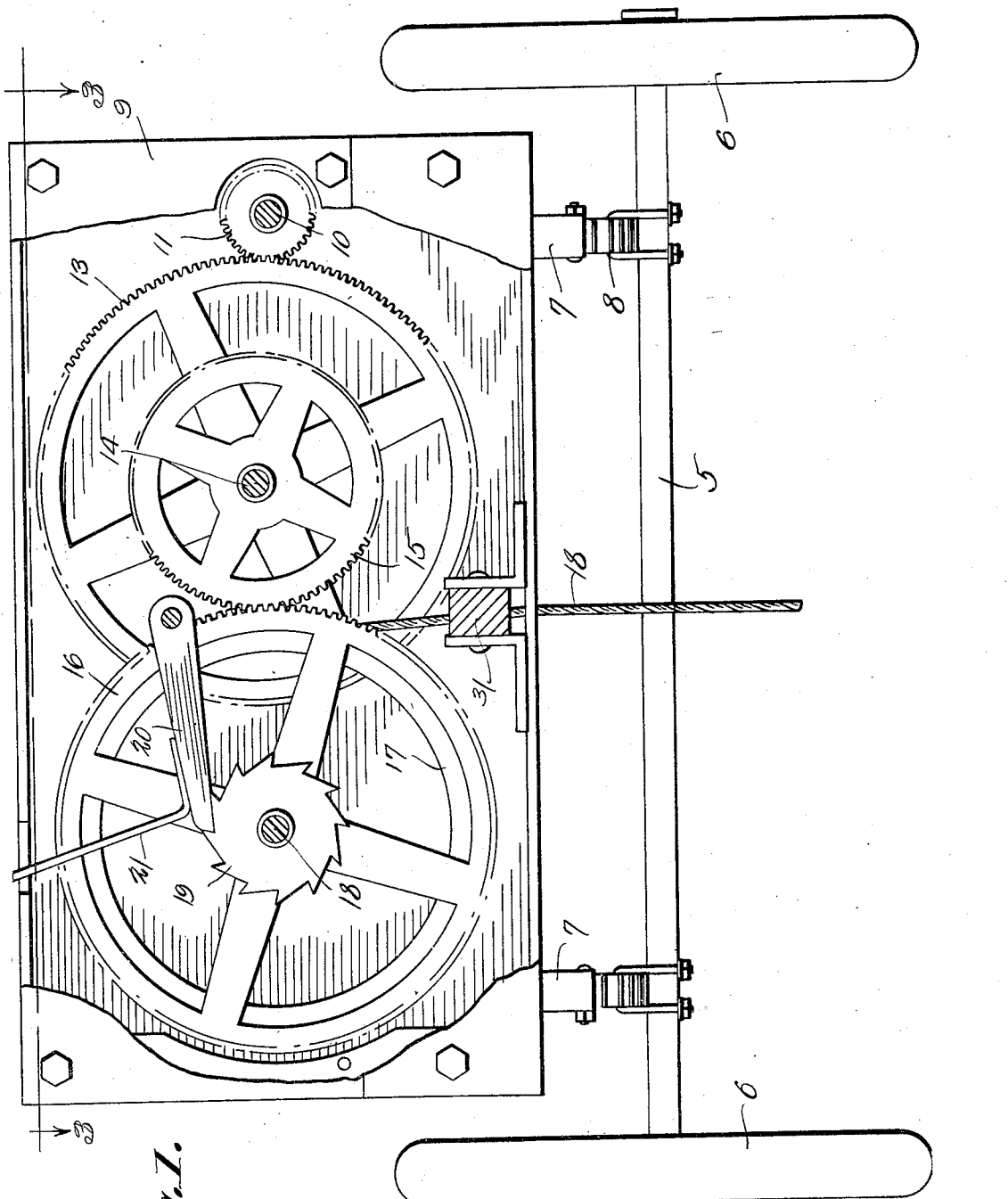
Figure 1 is a rear elevational view of a truck constructed in accordance with the invention, a portion of the gear housing being removed to illustrate the gearing housed thereby.
Figure 2:
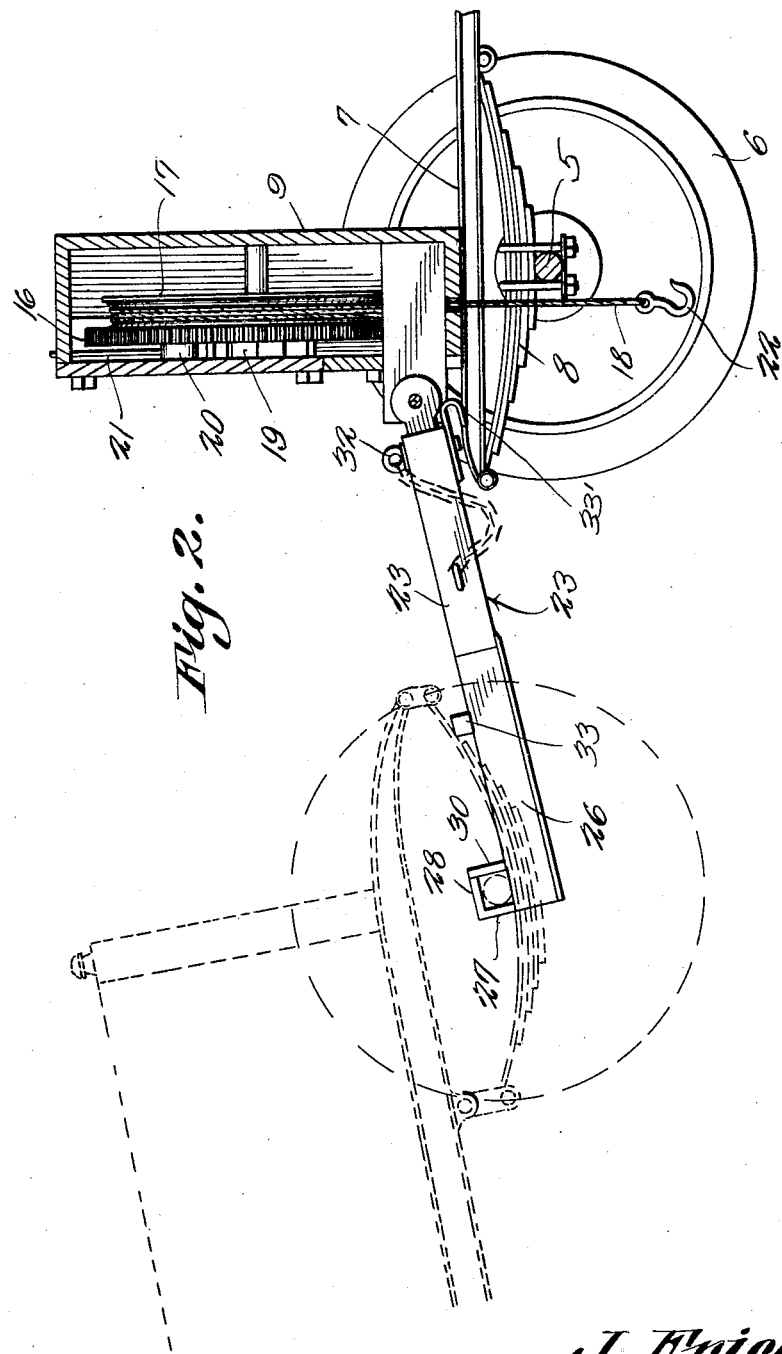
Figure 2 is an elevational view illustrating the rear end of a wrecking truck, showing the same as connected with a wrecked automobile, the gear housing being shown in section.

Referring to the drawings in detail, the reference character 5 designates the rear end of a towing truck, constructed in accordance with the invention, the reference character 6 designating the wheels mounted at the ends of the axle 5.

The towing truck includes bars 7 that are secured to the rear axle 5 by means of the springs 8, the front ends of the bars resting on the front axle of the truck, not shown. Mounted at the rear of the truck, is a gearing housing 9 that includes spaced walls, the walls having openings providing bearings for the various shafts of the gearing. The reference character 10 designates a shaft on which the pinion 11 is mounted, the pinion being secured to the shaft 10 to rotate therewith. One end of the shaft 10 extends through the housing to receive a suitable crank handle 12, whereby rotary movement may be imparted to the shaft 10 to rotate the pinion 11.

A substantially large gear 13 is mounted on the shaft 14 and is in mesh with the pinion 11 to receive rotary motion therefrom, the gearing being secured to shaft 14 to rotate the shaft therewith. A substantially small gear 15 is also secured to the shaft 14 and is in mesh with the gear 16 to which the pulley 17 is secured, the pulley 17 being designed to receive the lifting cable 18, which as shown is wound thereon. Secured to the shaft 18′ on which the gear 16 is mounted, is a ratchet wheel 19 that is engaged by the pawl 20, so that reverse movement of the gear 16 and pulley 17 is prevented, to the end that the cable 18 may be moved to a position to elevate the load lifted thereby, whereupon the cable will be held against unwinding, to the end that the load will be held in its elevated position.

Cooperating with the pawl 20 is a rod 21 that extends through an opening in the housing 9, the outer end of the rod 21 being formed into a handle to permit the rod to be operated by the attendant. The inner end of this rod 21 is secured to the pawl 20 so that by lifting the rod 21, the pawl 20 may be moved to disengage the ratchet 19 and permit the gear and pulley 17, to rotate in a clockwise direction to lower the rod. The cable 18 passes through an opening formed in the bottom of the housing 9.

A hook 22 is secured to the free end of the cable 18 so that the cable may be hooked onto the front axle, or other convenient place of connection, to connect the cable to the vehicle or rod to be lifted. It will of course be obvious that when the hook 23 has been properly positioned, the operator by rotating the shaft 10 may wind the cable on the pulley 17 with the minimum amount of exertion.

The towing bar is indicated generally by the reference character 23 and includes a tubular body portion 24 formed with lateral extensions 25 and 26. Upstanding hooks 27 are formed at the ends of the extensions 25 and 26, the upper ends of the hooks 27 extending inwardly as at 28, the hooks being so constructed that they will overlie the upper edge of the front axle of a motor vehicle. Cooperating with the inwardly extended ends 28 of the hooks 27, is a slidable member 29 that has upstanding fingers adapted to move to engage the inner edges of the inwardly extended portions 28, to lock the hooks on the axle.

The forward end of the slidable member 29 extends to a position in spaced relation with the front end of the body portion where it may be engaged by the pivoted bar 31 that has connection with the towing truck, the bar 31 acting to move the member 29 to its locking position. When the member 29 has been moved to its active or locking position, a pin such as indicated at 32 is inserted in the registering openings of the member 24 and bar 31, securing the member 31 to the member 24 in such a way that the wrecked automobile may be not only supported in its elevated position, but will be guided to permit the towing of the wrecked automobile, with facility.

Secured to the upper surface of the member 24 is a transversely extended bar 33 adapted to rest on the frame of the vehicle being towed, to insure a rigid connection between the towing bar and vehicle being towed. A hook 33′ is formed at the forward end of the member 24 and affords means whereby the connecting bar may be secured within the wrecking truck.

It might be further stated that the truck may be propelled in any well known manner, the construction and operation of the truck being immaterial.

I claim:

1. A towing bar comprising a tubular body portion, hook members formed at one end of the body portion and adapted to hook over the axle of a vehicle to be towed, a movable member mounted within the body portion, upstanding fingers at one end of the movable member and cooperating with the hooks in clamping the axle, and means for securing the movable member against movement.

2. A towing bar comprising a tubular body portion, hook members formed at one end of the body portion and adapted to hook over a car axle, a slidable member having upstanding fingers adapted to move into engagement with the hook members to close the hook members over the axle to which they are secured, a bar extending into the tubular body portion and adapted to engage one end of the slidable member to restrict movement of the slidable member and hold the slidable member into engagement with the car axle with which the towing bar is connected.

In testimony that I claim the foregoing as my own, I have hereto affixed my signature.

JONAS FRIEDEL.